US005511316A

United States Patent [19]

Fischer et al.

[11] Patent Number: 5,511,316

[45] Date of Patent: Apr. 30, 1996

[54] STENCIL FOR CUTTING SANDPAPER

[76] Inventors: Rory T. Fischer, 1202 8th, Imperial Beach, Calif. 91932; Eric S. Fischer, 818 B Ave., Coronado, Calif. 92118

[21] Appl. No.: 310,333

[22] Filed: Sep. 22, 1994

[51] Int. Cl.$^{6}$ .......... G01B 3/00

[52] U.S. Cl. .......... 33/1 F; 33/562

[58] Field of Search .......... 33/1 F, 562, 563, 33/564, 565, 566, 524, 525, 622, 623

[56] References Cited

U.S. PATENT DOCUMENTS

| | | | |
|---|---|---|---|
| D. 167,043 | 6/1952 | Kintz | 33/563 |
| 2,434,566 | 1/1948 | Hulsmann | 33/525 |
| 2,487,234 | 11/1949 | Gore | 33/525 |
| 2,500,873 | 3/1950 | Sager | 33/1 F |
| 2,690,017 | 9/1954 | Neill | 33/563 |
| 3,075,565 | 1/1963 | Weaver et al. | 33/525 |
| 3,081,551 | 3/1963 | Kraus | 33/623 |
| 3,246,399 | 4/1966 | Southern | 33/562 |
| 3,460,261 | 8/1969 | Frey | 33/27.03 |
| 3,699,660 | 10/1972 | Siegel | 33/565 |
| 4,274,459 | 6/1981 | Galajda | 33/563 |

FOREIGN PATENT DOCUMENTS

| | | | |
|---|---|---|---|
| 70316 | 12/1949 | Denmark | 33/622 |
| 4111412 | 10/1992 | Germany | 33/562 |
| 209174 | 6/1940 | Switzerland | 33/562 |

*Primary Examiner*—Thomas B. Will
*Attorney, Agent, or Firm*—Charles C. Logan, II

[57] ABSTRACT

A stencil for cutting sandpaper and it is formed from a sheet of plastic transparent plastic material having four corner lips extending down from the corners of the sheet. These corner lips have inner edges that define a rectangular recess for receiving a stack of standard sized sheets of sandpaper. Linear slots and arcuate slots in the stencil allow the sandpaper to be cut into two equal parts, three equal parts, four equal parts or circular disks having 6, 7, and 8 inch diameters.

11 Claims, 1 Drawing Sheet

STENCIL FOR CUTTING SANDPAPER

BACKGROUND OF THE INVENTION

The invention relates to stencils and more specifically to a stencil for cutting a standard sized sheet of sandpaper into smaller rectangular pieces or circular disk shaped pieces.

Presently sandpaper is marketed in sheets that are 280 millimeters long and 230 millimeters wide. If a person wishes to buy smaller pieces of sandpaper that are either rectangular or circular for specific sanders, they have to pay a premium price for these exact sizes of sandpaper. For contractors whose workers use a considerable amount of sandpaper, this would considerably increase the cost of performing the work.

Do-it-yourself handymen and tradesmen usually fold the standard sheet of sandpaper into smaller sizes and tear or cut them apart. This often results in a ragged edge and becomes a cumbersome problem especially when several small sheets are stacked upon each other and secured to a sander. If the ends of each sheet are not properly gripped, that sheet will be torn free during the sanding operation and requires stopping the work until the problem has been corrected or a new sheet of sandpaper is attached thereto.

It is an object of the invention to provide a novel stencil that can be used for cutting a standard sized sheet of sandpaper into several smaller sheets that may be either rectangular or circular.

It is also an object of the invention to provide a novel stencil for cutting sandpaper that eliminates the need for buying expensive smaller sheets that have been die cut to specific shapes for sanders and therefore cost a premium price.

It is another object of the invention to provide a novel stencil for cutting sandpaper that can be economically manufactured and marketed.

It is an additional object of the invention to provide a novel stencil for cutting sandpaper that can be used by either a tradesman or a do-it-yourself handyman and which requires minimal skills.

SUMMARY OF THE INVENTION

The novel stencil for cutting sandpaper is preferably made of a material such as polycarbonate plastic. The stencil itself would normally be rectangular in shape and be formed of a sheet of plastic material. The thickness of the sheet would be in the range of 1–5 mm. In its preferred form the stencil would be 320 millimeters long and 270 millimeters wide. The top surface of the stencil would normally be flat but it may have raised 12 inch ruler markings along its one edge.

Four corner lips extend downwardly from the bottom surface of the sheet of plastic material and they are positioned at the respective corners of the stencil. Each of these corner lips has a first and a second inner edge and they intersect each other at a substantially 90 degree angle. The respective inner edges of the corner lips define a recess whose length L1 is substantially equal to 280 millimeters and whose width W1 is equal to 230 millimeters. This recess is designed to receive a stack of standard sheets of sandpaper that are approximately 11 inches by 9 inches. The height of the corner lips is determined by the number of sheets to be cut. The height of the corner lips is H1 and it would normally be in the range of 1 to 4 mm. As an example, if the corner lip has a height of 2mm, 5 stacked sheets of 120 sandpaper could be received in the bottom recess of the stencil.

It is important that the sandpaper sheets to be cut be placed with their grit surface on the bottom. The bottom sheet and its grit surface contacts a support surface and creates sufficient friction for the stencil to remain stationary during the cutting operation. The remaining stacked sheets each have their grit surface pressing down on the rear surface of the sheet below them and add additional frictional resistance to movement of the stencil while cutting the sheets. Additionally, by cutting the rear surface of the sandpaper sheets, this prevents the rapid dulling of the edge on the knife or razor blade used to cut the sheets of sandpaper.

The novel stencil has been designed to create the capabilities for cutting the standard sandpaper sheets into ½ or ⅓ pieces such as would be used with palm sanders, pole sanders, and hand sanding. The stencil also has a capability for cutting the standard sheets into four equal rectangular pieces. Arcuate grooves in the stencil allow 6 inch, 7 inch, and 8 inch diameter circular sandpaper disks to be formed for orbital and disk sanders.

Since there are a multiplicity of grooves in the stencil, complete arcuate cuts and some of the straight cuts can not be made at a single positioning of the stacked sheets of sandpaper. Several of the corner lips have been provided with 45 degree edges and this allows the stencil to be lifted and rotated 45 degrees and replaced on the stack of sheets of sandpaper and thus allows the completion of the arcuate cuts to be made. Two of the corner lips have an inner edge formed at 90 degrees and they are spaced apart a distance equal to the width of the conventional sandpaper sheet. The edge along this stencil can then be used as a straight edge for completion of the ⅓ sheet grooves by placing this straight edge across the partially made ⅓ sheet cuts.

An aperture is formed in one of the corner lips so that the stencil can be hung from a nail or other similar type of structure. An Exacto knife, razor blade or other type of cutting edge would normally be inserted into the appropriate grooves for making the proper cuts. These grooves would have a width generally in the range of 0.5 mm–2mm. The sheet of plastic material would normally be transparent so it is possible to see through the stencil to the sandpaper therebeneath.

DESCRIPTION OF THE PREFERRED EMBODIMENT

Figure 1:
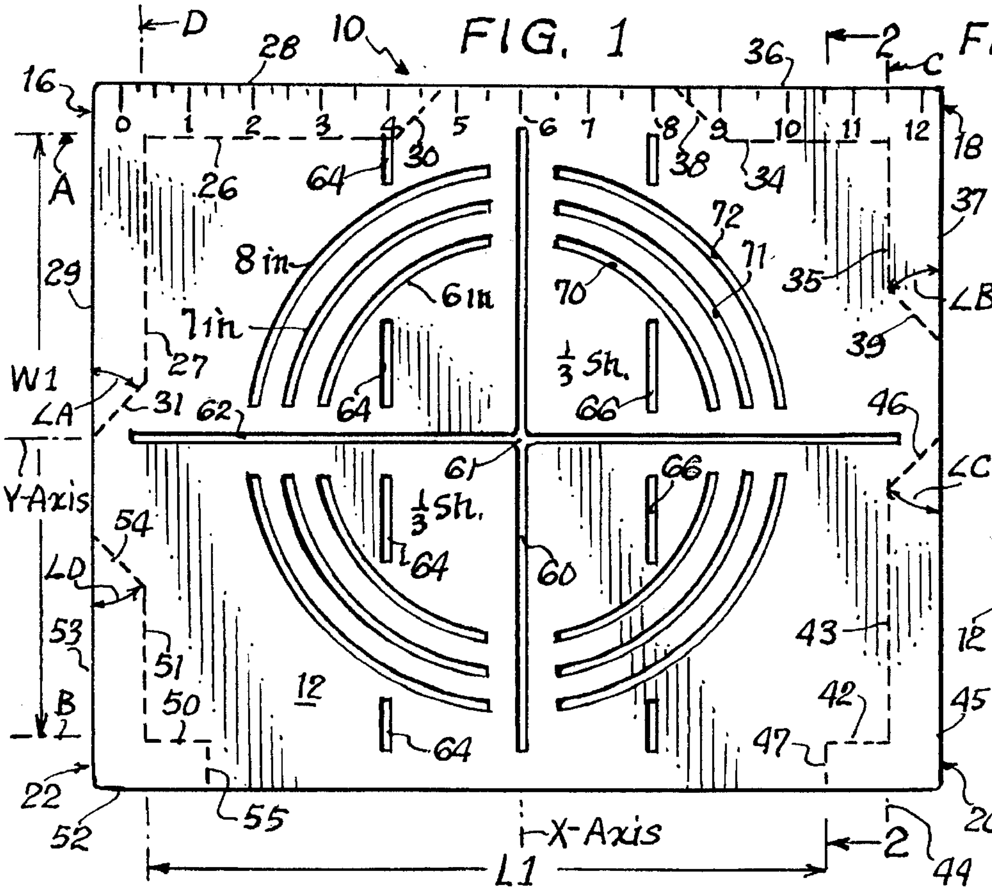
FIG. 1 is a top plan view of the novel stencil for cutting sandpaper.
Figure 2:
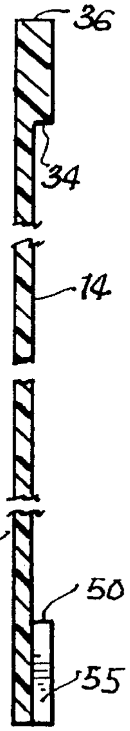
FIG. 2 is a cross sectional view taken along lines 2—2 of FIG. 1.

The novel stencil for cutting sandpaper will now be described by referring to FIGS. 1–4 of the drawing. The stencil is generally designated numeral 10. It is normally formed of a sheet of plastic material having a planar top surface 12 and a planar bottom surface 14.

In the embodiment illustrated, there is a first corner lip 16, a second corner lip 18, a third corner lip 20 and a fourth corner lip 22 extending downwardly from the bottom surface 14 of the sheet of plastic material. The outer periphery of the embodiment illustrated has a rectangular shape and the respective corner lips are located adjacent the respective corners of the rectangle.

First corner lip 16 has a first inner edge 26 and a second inner edge 27 that intersect each other at substantially a 90 degree angle. First inner edge 26 lies in vertical plane A. Second inner edge 27 lies in vertical plane D. First corner lip 16 also has a first outer edge 28 and a second outer edge 29. Connecting edges 30 and 31 make a 45 degree angle A with the respective first and second outer edges 28 and 29.

Second corner lip 18 has a first inner edge 34, a second inner edge 35, a first outer edge 36 and a second outer edge 37. Connecting edges 38 and 39 make a 45 degree angle B with the respective outer edges 36 and 37. First inner edge 34 also lies in vertical plane A. Second inner edge 35 lies in vertical plane C.

Third corner lip 20 has a first inner edge 42, a second inner edge 43, a first outer edge 44 and a second outer edge 45. Connecting edge 46 makes a 45 degree angle C with second outer edge 45. Connecting edge 47 makes a ninety degree angle with first outer edge 44. First inner edge 42 lies in vertical plane B. Second inner edge 43 lies in vertical plane C.

Fourth corner lip 22 has a first inner edge 50, a second inner edge 51, a first outer edge 52 and a second outer edge 53. Connecting edge 53 makes a 45 degree angle D with second outer edge 53. Connecting edge 55 makes a 90 degrees angle with first outer edge 52. First inner edge 50 also lies in vertical plane B. Second inner edge 51 lies in vertical plane D.

Linear slot 60 passes through a center point 61 and lies on an X-axis. Linear slot 62 is perpendicular to slot 60 and also passes through center point 61 and it lies along the Y-axis. The length of the respective slots 60 and 62 is such that they extend past the outer edge of the sandpaper sheets that have been placed in the recess formed in the bottom of the stencil. This allows complete cuts to be made for the four sheets.

The respective series of slots 64 and 66 allows the standard sized sheet of sandpaper to be cut into ⅓ sheet sections. After the primary cuts are made in the respective slots 64 and 66, straight edge 28 is placed adjacent these cuts and a cut can be made across the complete width of the sheet of sandpaper.

The series of arcuate slots 70, 71 and 72 allow 6 inch, 7 inch, and 8 inch circular disks of sandpaper to be formed. After the initial cuts have been made in any of the respective series of arcuate slots 70, 71 or 72, stencil 10 is lifted from the stacks of sandpaper, rotated 45 degrees and replaced on top of the sheets of sandpaper with connecting edges 30, 31, 38, 39, 46 and 54 functioning to lock the stack of sandpaper in a stationary position while the remainder of the series of slots 70, 71 or 72 are made to form a complete circle cut.

Figure 3:
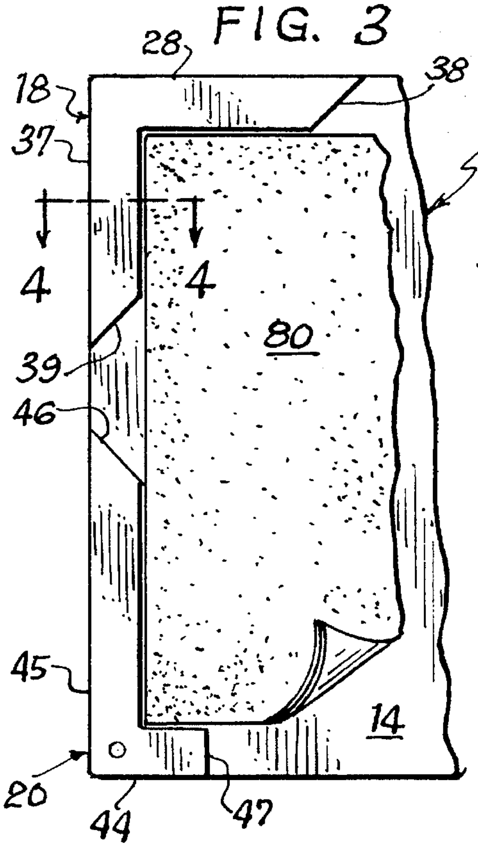
FIG. 3 is a partial bottom plan view of the novel stencil for cutting sandpaper showing several sheets nested in the recess formed by its corner lips.
Figure 4:
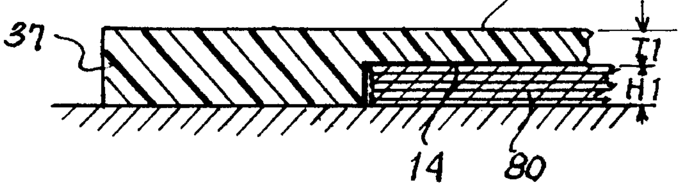
FIG. 4 is an enlarged cross sectional view taken along lines 4–4 of FIG. 3.

FIG. 3 shows a bottom plan view of stencil 10 with a plurality of sheets of sandpaper 80 captured between the respective corner lips. The corner lips seem to have a height H1.

What is claimed is:

1. A stencil for cutting sandpaper comprising:

a sheet of material having a predetermined thickness T1 and a predetermined peripheral shape, said sheet having a top surface and a planar bottom surface that has at least a first, a second, and a third downwardly extending corner lip having a predetermined height H1 that is substantially equal to the height of a predetermined number of sheets of sandpaper;

said corner lips each having a first inner edge and a second inner edge which intersect each other at a substantially 90 degree angle;

the first inner edge of said first corner lip and the first inner edge of said second corner lip substantially lie in a vertical plane A and the first inner edge of said third corner lip substantially lies in a vertical plane B that is parallel to vertical plane A and they are spaced a predetermined distance W1 apart;

the second inner edge of said second corner lip and the second inner edge of said third corner lip substantially lie in a vertical plane C and the second inner edge of said first corner lip substantially lies in a vertical plane D that is parallel to vertical plane C and they are spaced a predetermined distance L1 apart; and means in said sheet of material for guiding the cutting of a standard sized sheet of sandpaper into two equal rectangular pieces.

2. A stencil for cutting sandpaper as recited in claim 1 wherein the peripheral shape of said sheet is rectangular.

3. A stencil for cutting sandpaper as recited in claim 1 wherein H1 is in the range of 1–4 mm.

4. A stencil for cutting sandpaper as recited in claim 1 wherein said sheet is made of transparent material.

5. A stencil for cutting sandpaper as recited in claim 1 wherein said sheet of material has at least one straight edge.

6. A stencil for cutting sandpaper as recited in claim 1 wherein said sheet has means on its top surface for measuring distances.

7. A stencil for cutting sandpaper as recited in claim 1 further comprising means in said sheet of material for guiding the cutting of a standard sized sheet of sandpaper into four equal rectangular pieces.

8. A stencil for cutting sandpaper comprising:

a sheet of material having a predetermined thickness T1 and a predetermined peripheral shape, said sheet having a top surface and a planar bottom surface that has at least a first, a second, and a third downwardly extending corner lip having a predetermined height H1 that is substantially equal to the height of a predetermined number of sheets of sandpaper;

said corner lips each having a first inner edge and a second inner edge which intersect each other at a substantially 90 degree angle;

the first inner edge of said first corner lip and the first inner edge of said second corner lip substantially lie in a vertical plane A and the first inner edge of said third corner lip substantially lies in a vertical plane B that is parallel to vertical plane A and they are spaced a predetermined distance W1 apart;

the second inner edge of said second corner lip and the second inner edge of said third corner lip substantially lie in a vertical plane C and the second inner edge of said first corner lip substantially lies in a vertical plane D that is parallel to vertical plane C and they are spaced a predetermined distance L1 apart; and means in said sheet of material for guiding the cutting of a standard sized sheet of sandpaper into three equal rectangular pieces.

9. A stencil for cutting sandpaper comprising:

a sheet of material having a predetermined thickness T1 and a predetermined peripheral shape, said sheet having a top surface and a planar bottom surface that has at least a first, a second, and a third downwardly extending corner lip having a predetermined height H1 that is substantially equal to the height of a predetermined number of sheets of sandpaper;

said corner lips each having a first inner edge and a second inner edge which intersect each other at a substantially 90 degree angle;

the first inner edge of said first corner lip and the first inner edge of said second corner lip substantially lie in a vertical plane A and the first inner edge of said third corner lip substantially lies in a vertical plane B that is parallel to vertical plane A and they are spaced a predetermined distance W1 apart;

the second inner edge of said second corner lip and the second inner edge of said third corner lip substantially lie in a vertical plane C and the second inner edge of said first corner lip substantially lies in a vertical plane D that is parallel to vertical plane C and they are spaced a predetermined distance L1 apart; and means in said sheet of material for guiding the cutting of 6 inch circular discs out of a standard sized sheet of sandpaper.

10. A stencil for cutting sandpaper as recited in claim 9 further comprising means in said sheet of material for guiding the cutting of 7 inch circular discs out of a standard sized sheet of sandpaper.

11. A stencil for cutting sandpaper as recited in claim 9 further comprising means in said sheet of material for guiding the cutting of 8 inch circular discs out of a standard sized sheet of sandpaper.

* * * * *